US012750418B2

(12) United States Patent
Albero et al.

(10) Patent No.: US 12,750,418 B2
(45) Date of Patent: Sep. 29, 2026

(54) SYSTEM AND METHOD FOR DYNAMIC TASK NETWORK ROUTING BASED ON TASK SIMULATIONS ON VARIOUS SOFTWARE APPLICATIONS

(71) Applicant: Bank of America Corporation, Charlotte, NC (US)

(72) Inventors: George Albero, Charlotte, NC (US); Naga Vamsi Krishna Akkapeddi, Charlotte, NC (US); Sakshi Bakshi, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 164 days.

(21) Appl. No.: 18/901,058

(22) Filed: Sep. 30, 2024

(65) Prior Publication Data

US 2026/0095499 A1 Apr. 2, 2026

(51) Int. Cl.

*H04L 67/10* (2022.01)
*G06F 9/455* (2018.01)
*G06F 9/50* (2006.01)

(52) U.S. Cl.

CPC .............. *H04L 67/10* (2013.01); *G06F 9/455* (2013.01); *G06F 9/505* (2013.01); *G06F 2209/503* (2013.01)

(58) Field of Classification Search

CPC ..... H04L 67/10; G06F 9/455; G06F 2209/503
USPC .......................................................... 709/203
See application file for complete search history.

(56) References Cited

U.S. PATENT DOCUMENTS

| | | | |
|---|---|---|---|
| 7,805,377 | B2 | 9/2010 | Felsher |
| 7,818,215 | B2 | 10/2010 | King et al. |
| 8,331,228 | B2 | 12/2012 | Huber et al. |
| 8,904,181 | B1 | 12/2014 | Felsher et al. |
| 9,600,069 | B2 | 3/2017 | Publicover et al. |
| 9,794,797 | B2 | 10/2017 | Hoffberg |
| 9,849,364 | B2 | 12/2017 | Tran et al. |
| 10,346,843 | B2 | 7/2019 | Ozvat et al. |
| 10,445,234 | B2 | 10/2019 | Fleming et al. |
| 11,080,777 | B2 | 8/2021 | Isaacson et al. |
| 11,195,182 | B2 | 12/2021 | Ozvat et al. |
| 11,533,619 | B1 | 12/2022 | Kahn |

(Continued)

FOREIGN PATENT DOCUMENTS

| | | | | |
|---|---|---|---|---|
| CN | 117519996 A | * | 2/2024 | ........... G06F 9/5038 |
| CN | 112749156 B | * | 2/2025 | ......... G06F 16/2365 |

*Primary Examiner* — Lan Dai T Truong

(57) ABSTRACT

A system to implement a dynamic task network routing based on task simulations is disclosed. The system clusters software applications that have more than a threshold percentage of common parameters in common with each other. The parameters include system configuration and available processing resources. The system determines whether a first software application causes a first processor to perform a task portion. In response to determining that the task portion is not completed by the first processor, simulate the execution of the task portion of the task by a second processor associated with a second software application. The system determines that the simulation of the execution of the task portion of the task by the second processor indicates that the second software application, when executed by the second processor, causes the second processor to perform the task portion. The system routes the task to the second processor.

20 Claims, 3 Drawing Sheets

(56) References Cited

U.S. PATENT DOCUMENTS

| | | | |
|---|---|---|---|
| 2007/0003513 | A1 | 1/2007 | Waugh et al. |
| 2019/0121342 | A1 | 4/2019 | Cella et al. |
| 2020/0005295 | A1 | 1/2020 | Murphy |
| 2021/0271681 | A1 | 9/2021 | Jayaram et al. |
| 2022/0023742 | A1 | 1/2022 | Tran et al. |
| 2022/0075892 | A1 | 3/2022 | Jayaram et al. |
| 2023/0262118 | A1 | 8/2023 | Jayaram et al. |
| 2023/0379710 | A1 | 11/2023 | Kahn |

* cited by examiner

SYSTEM AND METHOD FOR DYNAMIC TASK NETWORK ROUTING BASED ON TASK SIMULATIONS ON VARIOUS SOFTWARE APPLICATIONS

TECHNICAL FIELD

The present disclosure relates generally to network routing, and more specifically to a system and method for dynamic task network routing based on task simulations on various software applications.

BACKGROUND

In a distributed development network, various portions of a task may be handled by different network nodes. When particular tasks are delayed or failed, processing and network resources at downstream computing devices are wasted.

SUMMARY

The disclosed system, described in the present disclosure, is particularly integrated into practical applications to improve the data network routing, task execution efficiency and reliability across distributed computing devices or multi-software applications, and resource allocation for executing tasks in the distributed environment.

In conventional systems, tasks may need to be processed by several software applications from the source software application to the target software application. For example, a first portion of the task may be processed by a first processor by executing a first software application residing in the first computing device, and a second portion of the task may be processed by a second processor executing a second software application residing in the second computing device. In some cases, a task processing operation may not be completed due to various reasons, such as data associated with the task getting corrupted by a software application due to the software application not being updated, network instability, unexpected excess network load at a computing device, unexpected excess processing load at a software application, among others. In such cases, the task may be delayed or failed, which causes processing and network resources at downstream computing devices to be wasted. For example, if a task fails to be processed by the first software application due to unexpected excess processing load, the task may be delayed or dropped entirely. This may result in the second software application and processing resources at the downstream computing device being underutilized, as they are left waiting for a task that is delayed or disregarded. This leads to wasting the processing and network resources at the downstream computing device.

The disclosed system is configured to provide a solution to these and other technical problems in the realm of task processing in a distributed network and multiple software applications. In some embodiments, the disclosed system is configured to implement a dynamic task network routing and network path selection. For example, the disclosed system is configured to analyze the task processing at each processor via a software application in terms of capability, network load, processing load, compatibility with the task, available processing, and memory resources, among others. In response, the disclosed system is configured to simulate the task execution at multiple backup software applications to identify a more optimal option of processor and/or software application for processing the task. In response, the disclosed system may determine a more optimal network path for processing the task traversing across multiple computing devices. This process, in turn, leads to avoiding bottlenecks or points of failure for the task.

In some embodiments, the disclosed system is configured to implement an augmented neural network to monitor the load at each computing device and route the task to computing devices to reduce excess load overhead at each computing device. In this way, the disclosed system improves resource utilization, reduces delays, and improves the overall functioning of the computing devices.

In some embodiments, the disclosed system is configured to implement a failure recovery method by detecting a failed task at a particular software application, simulating the execution of the task at one or more backup processors and/or backup software applications, selecting a more optimal processor to process the task, and routing the task data to the identified processor.

In some embodiments, the disclosed system is configured to implement a three-way key value pairing by creating dynamic pairings between the task data, the source software application, the potential backup software application, and the target software application to implement a three-dimensional map between these key value pairs. In this way, the three-dimensional mapping allows for a more flexible association between the key value pairs and accommodating changes in the network conditions or software applications' resource usage.

In some embodiments, a system comprises a memory operably coupled with a processor. The memory is configured to store task data, wherein the task data is associated with a task. The processor is configured to access a first set of parameters associated with a first software application, wherein the first set of parameters comprises at least one of a first amount of available processing resources or a first network load associated with the first software application. The processor is further configured to access a second set of parameters associated with a second software application, wherein the second set of parameters comprises at least one of a second amount of available processing resources or a second network load associated with the second software application. The processor is further configured to determine that more than a threshold percentage of the first set of parameters are within a threshold range from counterpart parameters from among the second set of parameters. The processor is further configured to cluster the first software application and the second software application together in response to determining that more than the threshold percentage of the first set of parameters are within the threshold range from the counterpart parameters from among the second set of parameters. The processor is further configured to determine that the task data is communicated to the first software application, that when executed by a first processor, is configured to cause the first processor to perform a first portion of the task. The processor is further configured to determine that the first portion of the task is not completed by the first processor. The processor is further configured to simulate an execution of the first portion of the task by a second processor associated with the second software application in response to determining that the first portion of the task is not completed by the first processor and that the first software application and the second software application are clustered together. The processor is further configured to determine that a simulation of the execution of the first portion of the task by the second processor indicates that the second software application, when executed by the second processor, causes the second processor to perform the first portion of the task. The processor is further configured to route the task data to the second processor in response to determining that the simulation of the execution of the first portion of the task by the second software application indicates that the second software application, when executed by the second processor, causes the second processor to perform the first portion of the task. The processor is further configured to determine that the task is executed.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
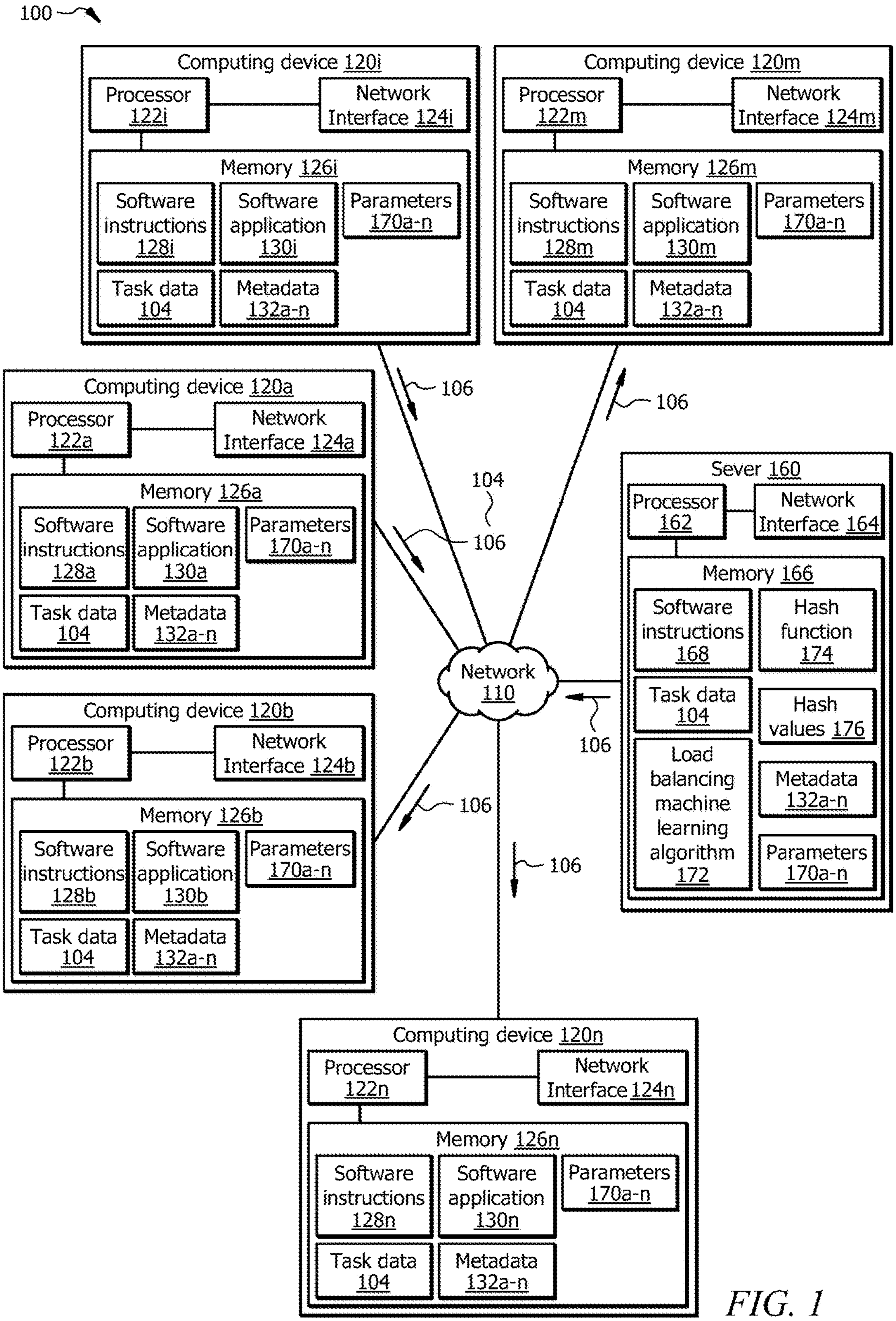
FIG. 1 illustrates an embodiment of a system configured to implement a dynamic task network routing based on task simulations.
Figure 2:
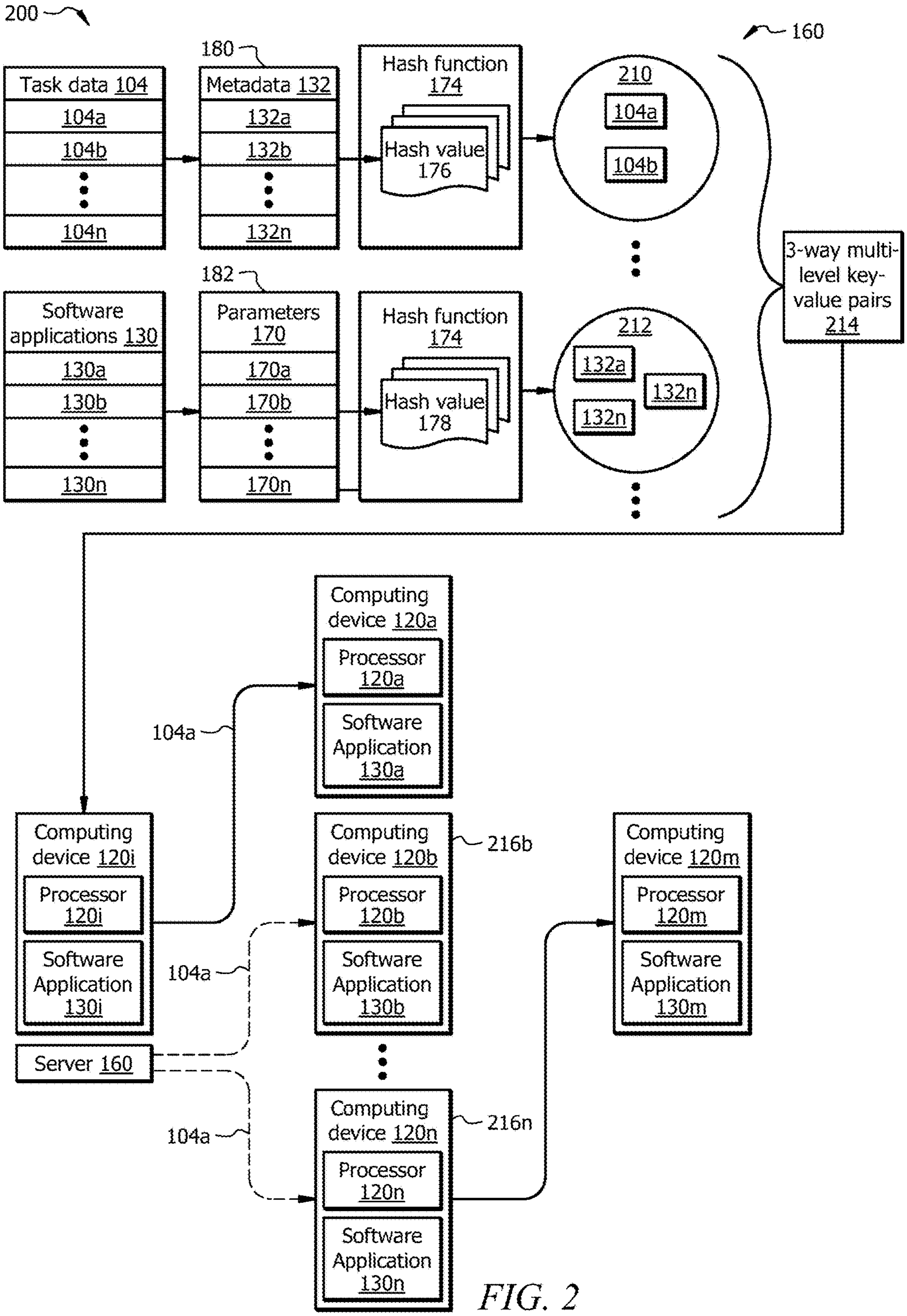
FIG. 2 illustrates an example operational flow of the system of FIG. 1.
Figure 3:
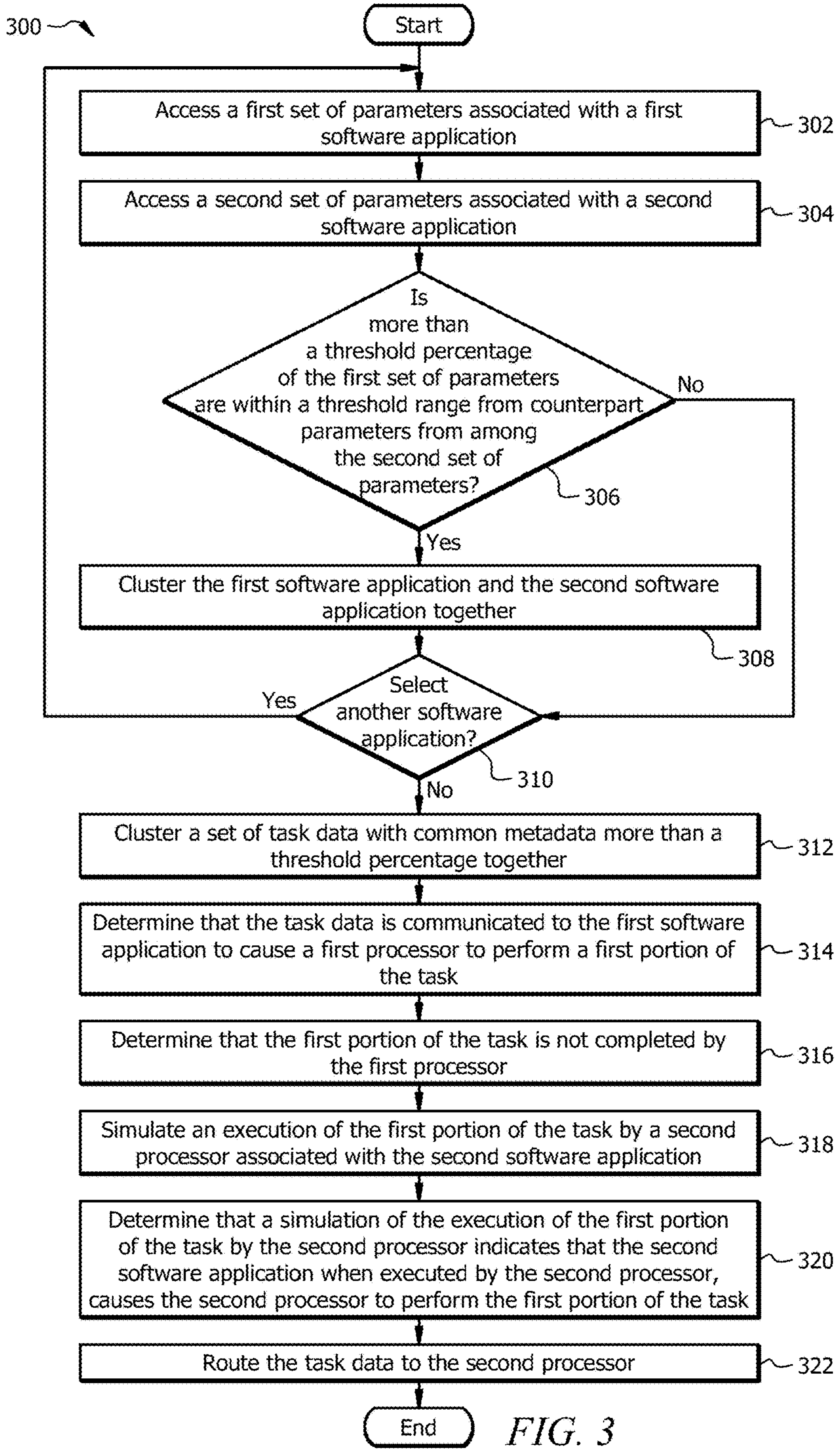
FIG. 3 illustrates an example flow chart of a method of the system of FIG. 1.

As described above, previous technologies fail to provide efficient and reliable solutions to implement a dynamic task network routing based on task simulations. Embodiments of the present disclosure and its advantages may be understood by referring to FIGS. 1 through 3. FIGS. 1 through 3 are used to describe systems and methods for implementing a dynamic task network routing based on task simulations, resource balancing, and multi-level key-value pairing between various pairs of tasks, source software applications, and target software applications, according to some embodiments.

System Overview

FIG. 1 illustrates an embodiment of a system 100 that is generally configured to implement a dynamic task network routing based on task simulation, resource balancing, and multi-level key-value pairing between various pairs of tasks, source software applications, and target software applications. In some embodiments, the system 100 comprises a server 160 communicatively coupled with one or more computing devices 120*a, b, i, n, m* (e.g., instances of a computing device 120) via a network 110. The network 110 enables the communication between the components of the system 100. Each computing device 120 may be used to send and receive task data 104 to and from other devices. The server 160 is configured to analyze task processing at each computing device 120*a-b*, determine whether a task processing fails at a given computing device 120, and in response, simulate the task 106 at one or more alternatives, backup software applications, identify a more optimal software application to execute the task 106, and route the task data 104 towards the computing device 120 where the identified software application resides. In other embodiments, system 100 may not have all of the components listed and/or may have other elements instead of, or in addition to, those listed above.

In general, the system 100 improves the data network routing and task execution efficiency and reliability across distributed computing devices or multi-software applications. In current systems, tasks 106 may need to be processed by several software applications from the source software application until the target software application. For example, a first portion of the task 106 may be processed by a first processor 122*a* by executing a first software application 130*a* residing in the first computing device 120*a*, and a second portion of the task 106 may be processed by a second processor 122*b* executing a second software application 130*b* residing in the second computing device 120*b*. In some cases, a task processing operation may not be completed due to various reasons, such as data associated with the task 106 getting corrupted by a software application due to the software application not being updated, network instability, unexpected excess network load at a computing device 120, unexpected excess processing load at a software application, among others. In such cases, the task may be delayed or failed, which causes processing and network resources at downstream computing devices to be wasted. For example, if a task 106 fails to be processed by the first software application due to unexpected excess processing load, the task 106 may be delayed or dropped entirely. This may result in the second software application and processing resources at the downstream computing device 120*b* being underutilized, as they are left waiting for a task 106 which is delayed or disregarded. This leads to wasting the processing and network resources at the downstream computing device 120*b*.

The disclosed system 100 is configured to provide a solution to these and other technical problems in the realm of task processing in a distributed network and multiple software applications. In some embodiments, the system 100 is configured to implement a dynamic task network routing and network path selection. For example, the system 100 is configured to analyze the task processing at each processor via a software application in terms of capability, network load, processing load, compatibility with the task 106, available processing and memory resources, among others. In response, the system 100 is configured to simulate the task execution at multiple backup software applications to identify a more optimal option of processor and/or software application for processing the task 106. In response, the system 100 may determine a more optimal network path for processing the task 106 traversing across multiple computing devices 120. This process, in turn, leads to avoiding bottlenecks or points of failure for the task 106.

In some embodiments, the system 100 is configured to implement an augmented neural network to monitor the load at each computing device 120 and route the task 106 to computing devices 120 to reduce excess load overhead at each computing device 120. In this way, the system 100 improves resource utilization, reduces delays, and improves the overall functioning of the computing devices 120.

In some embodiments, the system 100 is configured to implement a failure recovery method by detecting a failed task 106 at a particular software application, simulating the execution of the task 106 at one or more backup processors and/or backup software applications, selecting a more optimal processor to process the task 106, and routing the task data 104 to the identified processor.

In some embodiments, the system 100 is configured to implement a three-way key value pairing by creating dynamic pairings between the task data 104, the source software application, the potential backup software application, and the target software application to implement a three-dimensional map between these key value pairs. In this way, the three-dimensional mapping allows for a more flexible association between the key value pairs and accommodating changes in the network conditions or software applications' resource usage.

System Components

Network

Network 110 may be any suitable type of wireless and/or wired network. The network 110 may be connected to the Internet or public network. The network 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., Wi-Fi, WiGig, WiMAX, etc.), a long-term evolution (LTE) network, a universal mobile telecommunications system (UMTS) network, a peer-to-peer (P2P) network, a Bluetooth network, a near-field communication (NFC) network, and/or any other suitable network. The network 110 may include fiber optics, optical fibers, and the like to implement quantum communication channels. The network 110 may be configured to support any suitable type of communication protocol as would be appreciated by one of ordinary skill in the art.

Example Computing Device

Each of the computing devices 120*a, b, i, n*, and *m* is an instance of a computing device 120. The computing device 120 may generally be any device that is configured to process data and interact with users. Examples of the computing device 120 include, but are not limited to, a personal computer, a desktop computer, a workstation, a server, a laptop, a tablet computer, a mobile phone (such as a smartphone), smart glasses, Virtual Reality (VR) glasses, a virtual reality device, an augmented reality device, an Internet-of-Things (IoT) device, or any other suitable type of device. The computing device 120 may include a user interface, such as a display, a microphone, a camera, a keypad, or other appropriate terminal equipment usable by user 102.

Each computing device 120 may include a hardware processor, memory, and/or circuitry configured to perform any of the functions or actions of the computing device 120 described herein. For example, the computing device 120 includes a processor in signal communication with a network interface and a memory. The memory stores software instructions (e.g., code) that, when executed by the processor, cause the processor to perform one or more operations of the computing device 120 described herein. The user may use the computing device 120*a* to initiate the communication of the task data 104 to the computing device 120*b*. In some examples, the task data 104 may include a document, a file, an image, an audio file, and a video file, among others. The task data 104 may include headers that indicate the source network node, intermediate network nodes along the network path of the task data 104, and a destination network node for the task data 104, among others.

The computing device 120*a* includes a processor 122*a* in signal communication with a network interface 124*a* and a memory 126*a*. The memory 126*a* stores software instructions 128*a* that when executed by the processor 122*a* cause the processor 122*a* to perform one or more operations of the computing device 120*a* described herein. The computing device 120*a* is configured to communicate with other devices and components of the system 100 via the network 110. The computing device 120*a* may be associated with a user. The computing device 120*a* may be used to transfer task data 104.

Processor 122*a* comprises one or more processors. The processor 122*a* is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors may be implemented in cloud devices, servers, virtual machines, and the like. The processor 122*a* may be a programmable logic device, a microcontroller, a microprocessor, or any suitable number and combination of the preceding. The one or more processors are configured to process data and may be implemented in hardware or software. For example, the processor 122*a* may be 8-bit, 16-bit, 32-bit, 64-bit, or of any other suitable architecture. The processor 122*a* may include an arithmetic logic unit (ALU) for performing arithmetic and logic operations. The processor 122*a* may register the supply operands to the ALU and store the results of ALU operations. The processor 122*a* may further include a control unit that fetches instructions from memory and executes them by directing the coordinated operations of the ALU, registers, and other components. The one or more processors are configured to implement various software instructions. For example, the one or more processors are configured to execute instructions (e.g., software instructions 128*a*) to perform the operations of the computing device 120*a* described herein. In this way, processor 122*a* may be a special-purpose computer designed to implement the functions disclosed herein. In an embodiment, the processor 122*a* is implemented using logic units, FPGAs, ASICs, DSPs, or any other suitable hardware. The processor 122*a* is configured to operate as described in FIGS. 1-3. For example, the processor 122*a* may be configured to perform one or more operations of the operational flow 200 as described in FIG. 2, and one or more operations of the method 300 as described in FIG. 3.

Network interface 124*a* is configured to enable wired and/or wireless communications. The network interface 124*a* may be configured to communicate data between the computing device 120*a* and other devices, systems, or domains. For example, the network interface 124*a* may comprise an NFC interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 122*a* may be configured to send and receive data using the network interface 124*a*. The network interface 124*a* may be configured to use any suitable type of communication protocol.

The memory 126*a* may be a non-transitory computer-readable medium. The memory 126*a* may be volatile or non-volatile and may comprise read-only memory (ROM), random-access memory (RAM), ternary content-addressable memory (TCAM), dynamic random-access memory (DRAM), and/or static random-access memory (SRAM). The memory 126*a* may include one or more of a local database, a cloud database, a network-attached storage (NAS), etc. The memory 126*a* comprises one or more disks, tape drives, or solid-state drives, and may be used as an over-flow data storage device, to store programs when such programs are selected for execution, and to store instructions and data that are read during program execution. The memory 126*a* may store any of the information described in FIGS. 1-3 along with any other data, instructions, logic, rules, or code operable to implement the function(s) described herein when executed by processor 122*a*. For example, the memory 126*a* may store software instructions

128*a*, task data 104, software application 130*a*, metadata 132*a-n* (e.g., metadata 132*a, b, i, m, n*), parameters 170*a-n* (e.g., parameters 170*a, b, i, m, n*), and/or any other data or instructions described herein. The software instructions 128*a* may comprise any suitable set of instructions, logic, rules, or code operable to execute the processor 122*a* and perform the functions described herein, such as some or all of those described in FIGS. 1-3.

The software application 130*a* may be a mobile, a web, or software application. The software application 130*a* when executed by the processor 122*a*, may cause the processor 122*a* to perform a first portion of the task 106. In an example, the software application 130*a* may be configured to cause the processor to perform various tasks 106 related to coding, web development, software application development, data analysis, etc. For example, task 106 may be a code compilation task where different software applications 130 handle different portions or modules of the code. In a large-scale development environment, one software application 130*a* may be responsible for compiling Java files, while another software application 130*b* handles Python scripts or C++ modules.

The task 106 may be associated with the task data 104. The task data 104 may include metadata 132 including task type, processing resource requirement (e.g., an amount of processing resources to perform the task 106), the communication channel used to transmit the task data 104, ports used in the transmission of the task data 104, encryption methods used to encrypt the task data 104, among others.

Each of the components of each computing device 120*b*, 120*i*, 120*m*, and 120*n* may be the same or substantially similar to those previously described counterpart components of the computing device 120*a*, described above. Below is a corresponding brief description of each of the computing devices 120*b*, 120*i*, 120*m*, and 120*n*.

The computing device 120*b* includes a processor 122*b* in signal communication with a network interface 124*b* and a memory 126*b*. The memory 126*b* stores software instructions 128*b* that when executed by the processor 122*b* cause the processor 122*b* to perform one or more operations of the computing device 120*b* described herein. The computing device 120*b* may be used to perform at least a portion of the task 106. For example, the processor 122*b* may be configured to perform one or more operations of the operational flow 200 as described in FIG. 2, and one or more operations of the method 300 as described in FIG. 3.

The computing device 120*n* includes a processor 122*n* in signal communication with a network interface 124*n* and a memory 126*n*. The memory 126*n* stores software instructions 128*n* that when executed by the processor 122*n* cause the processor 122*n* to perform one or more operations of the computing device 120*n* described herein. The computing device 120*n* may be used to perform at least a portion of the task 106. For example, the processor 122*n* may be configured to perform one or more operations of the operational flow 200 as described in FIG. 2, and one or more operations of the method 300 as described in FIG. 3.

The computing device 120*i* includes a processor 122*i* in signal communication with a network interface 124*i* and a memory 126*i*. The memory 126*i* stores software instructions 128*i* that when executed by the processor 122*i* cause the processor 122*i* to perform one or more operations of the computing device 120*i* described herein. The computing device 120*i* may be used to perform at least a portion of the task 106. For example, the processor 122*i* may be configured to perform one or more operations of the operational flow 200 as described in FIG. 2, and one or more operations of the method 300 as described in FIG. 3.

The computing device 120*m* includes a processor 122*m* in signal communication with a network interface 124*m* and a memory 126*m*. The memory 126*m* stores software instructions 128*m* that when executed by the processor 122*m* cause the processor 122*m* to perform one or more operations of the computing device 120*m* described herein. The computing device 120*m* may be used to perform at least a portion of the task 106. For example, the processor 122*m* may be configured to perform one or more operations of the operational flow 200 as described in FIG. 2, and one or more operations of the method 300 as described in FIG. 3.

The parameters 170 (e.g., any of parameters 170*a* through 170*n*) associated with a given software application 130 (e.g., any of the software applications 130*a* through 130*n*) may include system configuration associated with the computing device 120 where the software application 130 resides, such as a model of the operating system (OS), compatibility with the task 106, among others. Some of the parameters 170 may be static, such as system configuration. Some of the parameters 170 may be dynamic, such as network traffic load, central processing unit (CPU) utilization in terms of percentage, available memory capacity in terms of memory size, current number of active connections with other devices, current number of tasks 106 that are being processed by the software application 130, processing load, among others.

Example Server

The server 160 generally includes a hardware computer system configured to implement a dynamic task network routing based on task simulation, resource balancing, and multi-level key-value pairing between various pairs of tasks, source software applications, and target software applications. In certain embodiments, the server 160 may be implemented by a cluster of computing devices, such as virtual machines. For example, the server 160 may be implemented by a plurality of computing devices using distributed computing and/or cloud computing systems in a network. In certain embodiments, the server 160 may be configured to provide services and resources (e.g., data and/or hardware resources as described herein etc.) to other components and devices.

Server 160 may comprise a processor 162 operably coupled with a network interface 164 and a memory 166. Processor 162 comprises one or more processors. The processor 162 is any electronic circuitry, including, but not limited to, state machines, one or more CPU chips, logic units, cores (e.g., a multi-core processor), FPGAs, ASICs, or DSPs. For example, one or more processors may be implemented in cloud devices, servers, virtual machines, and the like. The processor 162 may be a programmable logic device, a microcontroller, a microprocessor, or any suitable number and combination of the preceding. The one or more processors are configured to process data and may be implemented in hardware or software. For example, the processor 162 may be 8-bit, 16-bit, 32-bit, 64-bit, or of any other suitable architecture. The processor 162 may include an ALU for performing arithmetic and logic operations. The processor 162 may register the supply operands to the ALU and store the results of ALU operations. The processor 162 may further include a control unit that fetches instructions from memory and executes them by directing the coordinated operations of the ALU, registers, and other components. The one or more processors are configured to implement various software instructions. For example, the one or more processors are configured to execute instructions (e.g., software instructions 168) to perform the operations of the server 160 described herein. In this way, processor 162 may be a special-purpose computer designed to implement the functions disclosed herein. In an embodiment, the processor 162 is implemented using logic units, FPGAs, ASICs, DSPs, or any other suitable hardware. The processor 162 is configured to operate as described in FIGS. 1-3. For example, the processor 162 may be configured to perform one or more operations of the operational flow 200 of the system 100 described in FIG. 2 and one or more operations of the method 300 as described in FIG. 3.

Network interface 164 is configured to enable wired and/or wireless communications. The network interface 164 may be configured to communicate data between the server 160 and other devices, systems, or domains. For example, the network interface 164 may comprise an NFC interface, a Bluetooth interface, a Zigbee interface, a Z-Wave interface, a RFID interface, a Wi-Fi interface, a LAN interface, a WAN interface, a MAN interface, a PAN interface, a WPAN interface, a modem, a switch, and/or a router. The processor 162 may be configured to send and receive data using the network interface 164. The network interface 164 may be configured to use any suitable type of communication protocol.

The memory 166 may be a non-transitory computer-readable medium. The memory 166 may be volatile or non-volatile and may comprise ROM, RAM, TCAM, DRAM, and/or SRAM. The memory 166 may include one or more of a local database, a cloud database, a NAS, etc. The memory 166 comprises one or more disks, tape drives, or solid-state drives, and may be used as an over-flow data storage device, to store programs when such programs are selected for execution, and to store instructions and data that are read during program execution. The memory 166 may store any of the information described in FIGS. 1-3 along with any other data, instructions, logic, rules, or code operable to implement the function(s) described herein when executed by processor 162. For example, the memory 166 may store software instructions 168, task data 104, load balancing machine learning algorithm 172, hash function 174, hash values 176, metadata **132*a*-*n*, parameters 170*a*-*n*, and/or any other data or instructions. The software instructions 168 may comprise any suitable set of instructions, logic, rules, or code operable to execute the processor 162 and perform the functions described herein, such as some or all of those described in FIGS. 1-3. The server 160 may determine the parameters 170 by monitoring real-time performance metrics of the computing devices 120 and software application 130, querying the computing devices 120 and/or the software application 130 for their status, collecting logs, and analyzing system health reports, among others. The server 160 may use this information to classify or cluster the software applications 130 with common parameters 170**.

The load balancing machine learning algorithm 172 may be implemented by the processor 162 executing software instructions 168 and is generally configured to analyze parameters 170 related to each of the computing devices 120, predict a more optimal network path for each task data 104, dynamically allocate tasks 106 among available computing devices 120 to implement load balancing among the computing devices 120, and physically allocate tasks 106 to computing devices 120 based on current network conditions, resource availability, and processing capacity at each computing devices 120, among others.

The machine learning algorithm 172 may comprise a support vector machine, neural network, random forest, k-means clustering, etc. The machine learning algorithm 172 may be implemented by a plurality of augmented neural network (ANN) layers, neural network (NN) layers, convolutional NN (CNN) layers, long-short-term-memory (LSTM) layers, Bi-directional LSTM layers, recurrent NN (RNN) layers, and the like. In some examples, the machine learning algorithm 172 may be implemented by a combination of deep learning architectures and neural networks for feature extraction and other operations.

The hash function 174 may be implemented by the processor 162 executing software instructions 168 and is generally configured to generate a unique hash value 176 for each metadata 132 and generate a unique hash value 178 for each parameter 170. In some embodiments, the hash function 174 may include a secure hash algorithm (SHA-256), a message-digest algorithm 5 (MD5), and the like. Each hash value 176 may be a unique string, integer, etc. to uniquely identify a respective associated metadata 132. Each hash value 178 may be a unique string, integer, etc. to uniquely identify a respective associated parameter 170.

Operational Flow for Dynamic Task Network Routing

FIG. 2 illustrates an example operational flow 200 of system 100 (see FIG. 1) for implementing a dynamic task network routing based on task simulation, computational resource balancing, and multi-level key-value pairing between various pairs of tasks, source software applications, and target software applications. The operational flow 200 may begin when the server 160 classifies the tasks 106 (and/or the task data 104) that have common metadata 132 for more than a threshold percentage value 180 together. In this process, the server 160 may access each task data 104 to be processed or is being processed by a software application 130.

In some embodiments, the server 160, e.g., via machine learning algorithm 172, may extract a set of metadata 132 from each task data 104. In some embodiments, the server 160, e.g., via object-oriented programming-based algorithm, may identify data objects associated with each task data 104, where the data objects are variables or parameters defined for each task data 104. In response, the server 160 may identify the metadata 132 associated with each task data 104. The metadata 132 may include task type (e.g., data processing, web development, etc.), the communication channel used to transmit the task data 104 (e.g., hypertext transfer protocol (HTTP), hypertext transfer protocol secure (HTTPS), or WebSocket, etc.), the communication interface ports used in the transmission of the task data 104, and the encryption methods used to secure the task data 104 (e.g., transport layer security (TLS), secure sockets layer (SSL), or advanced encryption standard (AES)). The server 160 may extract the metadata **132*a*-*n* from the task data 104*a*-*n***, respectively.

In response, the server 160 may tokenize each metadata 132 for each task data 104. In this process, the server 160 may index/label each task data 104 with its respective metadata 132. This process may be used for identifying each task data 104 by searching for one or more of its respective metadata 132 in the memory/database where this information is stored. For example, the server 160 may use a hash function 174 to associate a hash value 176 to each metadata 132. Each hash value 176 may be used to uniquely identify its respective metadata 132. For example, a hash value 176 may be a serial number, an alphanumeric string, text, etc. In response, the server 160 may classify a set of task data 104 that share more than a threshold percentage (e.g., more than 80%, more than 85%, etc.) of common metadata 132. In this process, the server 160 may compare the metadata 132 of each task data 104 with the counterpart metadata 132 of another task data 104 and identify corresponding metadata 132. If, for example, a first task data 104*a* and a second task data 104*b* have more than 80% of their metadata 132 in common with each other, the server 160 may classify these two-task data 104*a-b* in the same group or cluster 210. The server 160 may generate and populate multiple clusters 210 with various task data 104 grouped together, similar to that described above.

Clustering Software Applications

The server 160 may cluster software applications 130 that have more than a threshold percentage (e.g., more than 80%, more than 85%, etc.) of common parameters 170. In this process, the server 160 may access information associated with each software application 130 in a network of computing devices 120*a-n*. The server 160 may extract a set of parameters 170*a-n* from software applications 130*a-n*, respectively. The parameters 170 associated with the given software application 130 may include an amount of available processing resources, network load associated with the given software application 130, compatibility with each task 106, among others as described herein. For example, the server 160 may extract the parameters 170*a* from the software application 130*a*, extract the parameters 170*b* from the software application 130*b*, and extract parameters 170*n* from the software application 130*n*.

In some embodiments, the server 160, e.g., via machine learning algorithm 172, may extract a set of parameters 170 from each software application 130. In some embodiments, the server 160, e.g., via object-oriented programming-based algorithm, may identify data objects associated with each software application 130, where the data objects are parameters or attributes of each software application 130.

The parameters 170*a* may include an amount of available processing resources at the computing device 120*a* where the software application 130*a* resides, network load associated with the software application 130*a*, and compatibility of the software application 130*a* with each task 106, among others. The parameters 170*b* may include a number of available processing resources at the computing device 120*b* where the software application 130*b* resides, network load associated with the software application 130*b*, compatibility of the software application 130*b* with each task 106, among others. The parameters 170*n* may include an amount of available processing resources at the computing device 120*n* where the software application 130*n* resides, network load associated with the software application 130*n*, compatibility of the software application 130*n* with each task 106, among others.

The server 160 may access the parameters 170 of each software application 130 for evaluation. The software application 130 may tokenize each parameter 170 for each software application 130. In this process, the server 160 may index/label each software application 130 with its respective parameters 170. This process may be used for identifying each software application 130 by searching for one or more of its respective parameters 170 in the memory/database where this information is stored. For example, the server 160 may use the hash function 174 to associate a hash value 178 to each parameter 170. Each hash value 178 may be used to uniquely identify its respective parameter 170. For example, a hash value 178 may be a serial number, an alphanumeric string, text, etc. In response, the server 160 may classify a set of software applications 130 that share more than a threshold percentage 182 (e.g., more than 80%, more than 85%, etc.) of common parameters 170.

The server 160 may determine which software applications 130 have more than a threshold percentage 182 of their parameters 170 in common/similar with each other. In this process, the server 160 may compare the parameters 170 of each software application 130 with the counterpart parameters 170 of another software application 130 and identify corresponding parameters 170. The server 160 may determine which software application 130 has similar/within a threshold range 184 of corresponding parameters 170 to identify software applications 130 to be clustered together. For example, if the server 160 determines that more than the threshold percentage 182 of the parameters 170*a* of the software application 130*a* are within a threshold range 184 from counterpart parameters 170*b* if the software application 130*b*, the server 160 may group the software applications 130*a* and 130*b* in the cluster 212. In another example, if the server 160 determines that more than the threshold percentage 182 of the parameters 170*a* of the software application 130*a* are within a threshold range 184 from counterpart parameters 170*n* if the software application 130*n*, the server 160 may group the software applications 130*a* and 130*n* in the cluster 212.

The threshold range 184 for each parameter 170 may be preconfigured. For example, the threshold range 184 for CPU utilization may be set to within 10% (e.g., both software applications 130*a-b* may have CPU utilization within 10% of each other), the threshold range 184 for available memory capacity may be set to within 200 megabits, the threshold range 184 for network traffic load may be configured to within 5 megabits per second (Mbps); the threshold range 184 for the number of active connections may be set to within 10 connections, and the threshold range 184 for processing load may be defined as within 15% of each other for software applications 130. The server 160 may generate and populate multiple clusters 212 with various software applications 130 grouped together, similar to that described above.

Creating Three-Way Key-Value Pairs

The server 160 may use the clusters 210 and 212 to identify the multi-level, three-way key value pairs 214. In this process, the server 160 may generate a first level of key-value pairs 214 by identifying which software application(s) 130 may be used to process each task 106 based on the metadata 132 and parameters 170. For example, the server 160 may determine which software application(s) 130 is associated with compatible parameters 170, including compatible system configuration, available processing capability, available memory capacity, and available network load bandwidth, among others that can satisfy the processing, memory, network resource, compatibility requirement as indicated in each metadata 132. For example, assume that the server 160 generates a first key value pair 214, such as {key1: task data 104*a*; value: software application 130*a*} which indicates that the task data 104*a* can be processed by software application 130*a* due to its compatible parameters 170*a*. The server 160 may generate other key-value pairs 214 to pair each task data 104 with at least one software application 130*a-n*.

The server 160 may generate a second level of key-value pairs 214 by identifying backup, alternative software application(s) 130 for each software application 130 to determine which other software applications 130 have compatible parameters 170 that can serve as backups in case the primary software application 130 fails or is unable to cause its respective processor 122 to process the task 106 based on the parameters 170 of each software application 130 and the content of the clusters 212. For example, assume that the server 160 identifies that software application 130*b* may act as a backup for software application 130*a* due to being in the same cluster 212 as the software application 130*a* and/or having more than the threshold percentage 182 of its parameters 170*b* being within the threshold range 184 of the counterpart parameters 170*a*. In this example, the server 160 may generate a key-value pair 214 such as {key2: software application 130*a*; value: backup software application 130*b*} which indicates that if software application 130*a* is unable to complete at least a portion of the task 106 (by being executed by the processor 122*a*), software application 130*b* may be utilized as an alternative. The server 160 may generate other key-value pairs 214 for each software application 130 to identify their backups.

The server 160 may generate a third level of key-value pairs 214 by identifying a suitable target or destination software application 130 for each task data 104 based on the metadata 132 of each task data 104 and parameters 170 of each software application 130. For example, the server 160 may generate a key-value pair 214, such as {key3: task data 104*a*; value: target software application 130*m*}, indicating that the target software application 130*m* may be used as a destination to complete the processing of the task data 104*a* by being executed by the processor 122*m*. The server 160 may generate other key-value pairs 214 for each task data 104 to identify their destinations. Each key-value pair 214 may change or be updated dynamically because of the dynamic nature of the metadata 132 and/or parameters 170 based on real-time conditions such as changes in network traffic load, changes in CPU utilization, and changes in available memory capacity, among others.

Dynamic Task Network Routing

In an example scenario for task processing in a network, assume that the task data 104*a* is originated from the source computing device 120*i* via the source software application 130*i*. The source software application 130*i* may be an instance of a software application 130 and may reside in a computing device 120*i*. Assume that the server 160 initially routes task data 104*a* to the computing device 120*a* so the processor 122*a* performs a first portion of the task data 104*a* via the software application 130*a*. However, during execution, processor 122*a* via the software application 130*a* fails to complete a first portion of the task 106 due to issues such as high CPU utilization, insufficient memory, or network congestion, among others as described herein. In response, the server 160 may determine that the first portion of task 106 is not completed by the computing device 120*a* executing the software application 130*a*, e.g., in response to determining that an error message or an incomplete status notification is received from the computing device 120*a*.

In response, the server 160 may identify one or more backup computing devices 120 (and/or backup software applications 130) associated with the software application 130*a* based on the key-value pairs 214 that identify the one or more backup software applications 130 for the software application 130*a* and/or the cluster 212. In response to determining that the first portion of the task 106 is not completed by the processor 122*a* (via software application 130*a*) and that the software applications 130*a*, 130*b*, and 130*n* are clustered together, the server 160 may simulate an execution of the first part of the task 106 at each of the computing devices 120*b* and 120*n* via software applications 130*b* and 130*n*, respectively. In this process, in some embodiments, the server 160 may deploy a virtual machine to execute a simulated version of the first part of the task 106 on each of the backup software applications 130*b* and 130*n*.

The simulation environment at each virtual machine may have corresponding parameters 170*b* for simulating running the first part of the task 106 by the processors 122*b* and 122*n* (via software application 130*a* and 130*b*), respectively. In some embodiments, the server 160 may simulate an execution of the first part of the task 106 at each computing device 120*b* and 120*n* (via the respective software applications 130*b* and 130*n*) by creating a virtual representation of each computing devices 120*b* and 120*n* with respective virtual representation of software application 130*b* and 130*n* in the memory 166 of the server 160 to mimic the execution environment and processing conditions of these backup software applications 130*b* and 130*n*, respectively.

In some embodiments, the server 160 may communicate a dummy task data 104*a* to the computing devices 120*b* and 120*n* (to the respective software applications 130*b* and 130*n*) to simulate the execution of the dummy task data 104*a* by each of processor 122*b* executing the software application 130*b* and processor 122*n* executing software application 130*n*. The dummy task data 104*a* may be a representation of the task data 104*a* that mimics the characteristics of the actual task data 104*a*, such as size, function, processing requirements, and a data flow pattern.

The server 160 may determine the performance metrics 216*b*-*n* of each simulation process. The performance metrics 216*b*-*n* may include processing time, computational resource utilization, memory resource utilization, error rates, response time, completion of the first part of the task 106, among others. The server 160 may compare the performance metrics 216*b* for simulating the first portion of the task 106 by the virtual representation of the computing device 120*b* via the software application 130*b* with the performance metrics 216*n* for simulating the first portion of the task 106 by the virtual representation of the computing device 120*n* via the software application 130*n*. In response, the server 160 determines which environment (e.g., the virtual representation of computing device 120*b* where the processor 122*b* implements the software application 130*b* to perform the first portion of the task 106 or virtual representation of computing device 120*n* where the processor 122*n* implements the software application 130*n* to perform the first portion of the task 106) is a more optimal option to perform the first part of the task 106.

For example, assume that server 160 determines that the simulation of the execution of the first portion of the task 106 by the virtual representation of computing device 120*n* indicates that the software application 130*n*, when executed by the processor 122*n*, causes the processor 122*n* to perform the first portion of the task 106 and that its performance metrics 216*n* are more favorable compared to the performance metrics 216*b*.

For example, by comparing the performance metrics 216*n* with the performance metrics 216*b*, it may be determined that the processing time for executing the first part of the task 106 by the processor 122*n* when executing the software application 130*n* is 20% less than that of processor 122*b*, the memory utilization of processor 122*n* to perform the first part of the task 106 when executing the software application 130*n* is 25% lower than when the software application 130*b* is executed by the processor 122*b*, the CPU load for the processor 122*n* caused by the software application 130*n* when executed by the processor 122*n* to perform the first part of the task 106 is 15% less than that caused by the software application 130*b* for the processor 122*b*, and the network latency caused by the software application 130*n* being executed by the processor 122*n* to perform the first part of the task 106 is 5 milliseconds less than that caused by the software application 130*b* for the processor 122*b* to perform the first part of the task 106. In response, the server 160 may determine that the software application 130*n*, when executed by the processor 122*n*, causes the processor 122*n* to perform the first part of the task 106 (more efficiently and reliably than the processor 122*b* via software application 130*b*) and that it is the more optimal backup for the software application 130*a*.

In some embodiments, the server 160, e.g., via the load balancing machine learning algorithm 172, may evaluate the processing and/or network load associated with each computing device 120*b* and 120*n*, where the software applications 130*b* and 130*n* reside, respectively, in conjunction with executing the portion(s) of the task 106. Additionally, the server 160 may evaluate the processing and/or network load specifically associated with each of the software applications 130*b* and 130*n*. In response, the server 160 may route the task 106 to computing device 120*n* to balance the processing and network loads among the computing devices 120*b* and 120*n*, if it determines that computing device 120*n* has a lower load. Alternatively, or additionally, the server 160 may route the task 106 to balance the load among the software applications 130*b* and 130*n* if it determines that software application 130*n* has a lower processing and network load compared to software application 130*b*. The server 160 may perform a similar operation for each stage where a given portion of the task 106 is to be executed at a given software application 130.

In some embodiments, in this way, the server 160 may dynamically update the network path of the task 106 to reduce the processing time, increase the success rate for task processing and completion, improve load balancing among computing devices 120, reduce network load congestion at each computing device 120 and/or software application 130, among others.

The server 160 may determine a target software application 130 for the task 106 based on the key-value pair(s) 214 that indicate the target software application(s) 130 for the task data 104*a*. For example, assume that the server 160 identifies a key-value pair 214 that indicates that the software application 130*m* is a target software application 130*m* to be used for processing and completing the task 106 based on the parameters 170 associated with the target software application 130*m* and metadata 132*a*. The key-value pair 214 may be represented by {key: task data 104*a*; value: target software application 130*m*}. In response, the server 160 uses this information to route the task data 104*a* to the identified target software application 130*m*.

The server 160 may determine that the task 106 is executed by the processor 122*m* of the computing device 120*m* executing the software application 130*m*, e.g., the remaining part of the task 106 is performed by the computing device 120*m* via software application 130*m*. In this manner, the server 160 may adjust the network path of the task data 104*a*.

In some embodiments, each of the software applications 130*i, a, b, n*, and *m* may reside in a different, distinct computing device 120. In some embodiments, the server 160 may determine that the processor 122*a* via software application 130*a* has sufficient processing resources to perform the first portion of the task 106. In response, the server 160 may generate a first key-value pair 214 that comprises the task data 104*a* and the software application 130*a* to associate the task data 104*a* and the software application 130*a* in response to determining that the processor 122*a* has sufficient processing resources to perform the first portion of the task 106*a* and that the software application 130*a* is compatible with the task type of the task 106, where task data 104*a* is communicated to the software application 130*a* in response to compatibility between the task data 104*a* and the software application 130*a* based at least in part upon the first key-value pair 214 similar to that described herein.

In some embodiments, the server 160 may generate a second key-value pair 214 comprising the first software application 130*a* and the second software application 130*b* based on the parameters 170*a-b* to associate the first software application 130*a* with the second software application 130*b*, where the second software application 130*b* is determined to be a backup for the first software application 130*a* if the first software application 130*a* fails to cause the processor 122*a* to perform the first portion of the task 106, similar to that described above. The server 160 may perform a similar operation for the software applications 130*a* and 130*n* to generate another key-value pair 214 comprising the first software application 130*a* and the software application 130*n* based on the parameters 170*a* and 170*n*.

In some embodiments, the server 160 may determine that the processor 122*n* has sufficient processing resources to perform the first portion of the task 106 via the software application 130*n*. The server 160 may determine that the software application 130*n* is compatible with a task type associated with the task 106 based on the metadata 132*a* and parameters 170*n*. The server 160 may determine that the software application 130*n* can be used as a backup for the software application 130*a* if the software application 130*a* fails to cause the processor 122*a* to perform the first portion of the task 106.

The server 160 may generate a third key-value pair 214 comprising the first software application 130*a*, the second software application 130*n*, and the task data 104*a* in response to determining that the second software application 130*n* can be used as a backup for the first software application 130*a* if the first software application 130*a* fails to cause the processor 122*a* to perform the first portion of the task 106, where task data 104*a* is communicated to the second software application 130*n* in response to compatibility between the task data 104*a* and the second software application 130*n* based at least in part upon the third key-value pair 214, metadata 132*a*, and parameters 170*a* and 170*n*.

In some embodiments, determining that the first portion of the task 106 is not completed by the processor 122*a* via the first software application 130*a* comprises determining that the first network load associated with the processor 122*a* and/or software application 130*a* exceeds a predefined threshold (e.g., more than 80% of the network bandwidth capacity) or causes a delay of more than an acceptable latency (e.g., more than 100 milliseconds).

In some embodiments, the server 160 may simulate the execution of the first portion of the task 106 at each of a set of backup computing devices 120*b-n* (e.g., via software applications 130*b-n* respectively) in response to determining that the first portion of the task 106 failed to be performed by the first processor 122*a* via the software application 130*a*.

In response, the server 160 may evaluate a performance of each of the set of backup computing devices 120*b-n* (e.g., via software applications 130*b-n* respectively) in executing the first portion of the task 106, where the performance of each of the set of backup computing devices 120*b-n* (e.g., via software applications 130*b-n* respectively) is determined in terms of delay, resource utilization, and success rate. The server 160 may determine that the performance metrics 216*n* of the second computing device 120*n* is more than the performance metrics 216 of the rest of the set of backup computing device 120. In response, the server 160 may select the second computing device 120*n* to perform the first portion of the task 106 via the software application 130*n*. Therefore, in some embodiments, routing the task data 104*a* to the second software application 130*n* is in response to determining that the performance metrics 216*n* of the computing device 120*n* is more than the performance metrics 216 of the rest of the set of backup computing device 120. In this manner, the server 160 is configured to physically allocate and assign physical resources, such as one or more of computing devices 120 and their respective computational and memory resources, as well as network bandwidth, to perform tasks 106 more efficiently in a distributed network of computing devices 120.

Example Method for Implementing a Dynamic Task Network Routing

FIG. 3 illustrates an example flowchart of a method 300 for implementing a dynamic task network routing based on task simulation, resource balancing, and multi-level key-value pairing between various pairs of tasks, source software applications, and target software applications, according to some embodiments. Modifications, additions, or omissions may be made to method 300. Method 300 may include more, fewer, or other operations. For example, operations may be performed in parallel or in any suitable order. While at times it is discussed that the system 100, computing devices 120*a-n*, server 160, or components of any of thereof perform some operations, any suitable system or components of the system may perform one or more operations of the method 300. For example, one or more operations of method 300 may be implemented, at least in part, in the form of software instructions 128*a-n*, 168 of FIG. 1, stored on a tangible non-transitory machine-readable medium (e.g., memory 126*a-n*, 166 of FIG. 1) that when run by one or more processors (e.g., processor 122*a-n*, 162 of FIG. 1) may cause the one or more processors to perform operations 302-322.

The server 160 may cluster software applications 130 with common parameters 170 together, similar to that described in FIGS. 1-2. To this end, the server 160 may perform operations 302 to 310. At operation 302, the server 160 accesses a first set of parameters 170*a* associated with the first software application 130*a*, similar to that described in FIGS. 1-2.

At operation 304, the server 160 accesses a second set of parameters 170*b* associated with the second software application 130*b*, similar to that described in FIGS. 1-2.

At operation 306, the server 160 determines whether more than a threshold percentage of the first set of parameters 170*a* are within a threshold range from counterpart parameters 170*b* from among the second set of parameters 170*b*, similar to that described in FIGS. 1-2.

At operation 308, the server 160 clusters the first software application 130*a* and the second software application 130*b* together, e.g., in software application cluster 212, similar to that described in FIGS. 1-2.

At operation 310, the server 160 determines to select another software application 130. The server 160 may select another software application 130 if at least one software application is left to evaluate. If it is determined that at least another software application 130 is left to evaluate, the method 300 returns to operation 302 to evaluate other software applications 130. Otherwise, the method 300 proceeds to operation 312.

At operation 312, the server 160 clusters a set of task data 104 with common metadata 132 more than a threshold percentage value 180 together, similar to that described in FIGS. 1-2.

At operation 314, the server 160 determines that the task data 104*a* is communicated to the first software application 130*a* to cause the first processor 122*a* to perform the first portion of the task 106, similar to that described in FIGS. 1-2.

At operation 316, the server 160 determines that the first portion of the task 106 is not completed by the first processor 122*a*, similar to that described in FIGS. 1-2.

At operation 318, the server 160 simulates an execution of the first portion of the task 106 by the second processor 122*n* associated with the second software application 130*n*, similar to that described in FIGS. 1-2.

At operation 320, the server 160 determines that a simulation of the execution of the first portion of the task 106 by the second processor 122*n* indicates that the second software application 130*n*, when executed by the second processor 122*n*, causes the second processor 122*n* to perform the first portion of the task 106, similar to that described in FIGS. 1-2.

At operation 322, the server 160 routes the task data 104*a* to the second processor 122*n*, similar to that described in FIGS. 1-2. In some embodiments, the server 160 may execute the task 106.

While several embodiments have been provided in the present disclosure, it should be understood that the system 100 and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented. In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein. To aid the Patent Office, and any readers of any patent issued on this application in interpreting the claims appended hereto, applicants note that they do not intend any of the appended claims to invoke 35 U.S.C. § 112(f), as it exists on the date of filing hereof, unless the words "means for" or "step for" are explicitly used in the particular claim.

The invention claimed is:

1. A system comprising:

a memory configured to store task data, wherein the task data is associated with a task, and a processor, operably coupled to the memory, and configured to:

access a first set of parameters associated with a first software application, wherein the first set of parameters comprises at least one of a first amount of available processing resources or a first network load associated with the first software application;

access a second set of parameters associated with a second software application, wherein the second set of parameters comprises at least one of a second amount of available processing resources or a second network load associated with the second software application;

determine that more than a threshold percentage of the first set of parameters are within a threshold range from counterpart parameters from among the second set of parameters;

cluster the first software application and the second software application together in response to determining that more than the threshold percentage of the first set of parameters are within the threshold range from the counterpart parameters from among the second set of parameters;

determine that the task data is communicated to the first software application, that when executed by a first processor, is configured to cause the first processor to perform a first portion of the task;

determine that the first portion of the task is not completed by the first processor; and in response to determining that the first portion of the task is not completed by the first processor and that the first software application and the second software application are clustered together:

simulate an execution of the first portion of the task by a second processor associated with the second software application;

determine that a simulation of the execution of the first portion of the task by the second processor indicates that the second software application, when executed by the second processor, causes the second processor to perform the first portion of the task;

in response to determining that the simulation of the execution of the first portion of the task by the second software application indicates that the second software application, when executed by the second processor, causes the second processor to perform the first portion of the task, route the task data to the second processor; and determine that the task is executed.

2. The system of claim 1, wherein:

the first software application resides within a first computing device comprising the first processor; and the second software application resides within a second computing device comprising the second processor.

3. The system of claim 1, wherein the processor is further configured to:

extract a set of metadata associated with the task data, wherein the set of metadata comprises at least one of a task type or an amount of processing resources to perform the task;

determine that the first processor has sufficient processing resources to perform the first portion of the task;

determine that the first software application is compatible with the task type; and generate a first key-value pair comprising the task data and the first software application to associate the task data and the first software application in response to determining that the first processor has sufficient processing resources to perform the first portion of the task and that the first software application is compatible with the task type, wherein task data is communicated to the first software application in response to a compatibility between the task data and the first software application based at least in part upon the first key-value pair.

4. The system of claim 1, wherein the processor is further configured to generate a second key-value pair comprising the first software application and the second software application to associate the first software application with the second software application, wherein the second software application is determined to be a backup for the first software application if the first software application fails to cause the first processor to perform the first portion of the task.

5. The system of claim 1, wherein the processor is further configured to:

determine that the second processor has sufficient processing resources to perform the first portion of the task;

determine that the second software application is compatible with a task type associated with the task;

determine that the second software application can be used as a backup for the first software application if the first software application fails to cause the first processor to perform the first portion of the task; and generate a third key-value pair comprising the first software application, the second software application, and the task data in response to determining that the second software application can be used as a backup for the first software application if the first software application fails to cause the first processor to perform the first portion of the task, wherein task data is communicated to the second software application in response to compatibility between the task data and the second software application based at least in part upon the third key-value pair.

6. The system of claim 1, wherein determining that the first portion of the task is not completed by the first software application comprises determining that the first network load associated with the first software application exceeds a predefined threshold or causes a delay of more than an acceptable latency.

7. The system of claim 1, wherein the processor is further configured to:

simulate the execution of the first portion of the task at each of a set of backup software applications in response to determining that the first portion of the task failed to be performed by the first processor;

evaluate a performance of each of the set of backup software applications in conjunction with executing the first portion of the task, wherein the performance of each of the set of backup software applications is determined in terms of one or more of delay, resource utilization, and success rate;

determine that the performance of the second software application is more than the performance of a rest of the set of backup software applications; and select the second software application to cause the second processor to perform the first portion of the task in response to determining that the performance of the second software application is more than the performance of the rest of the set of backup software applications, wherein routing the task data to the second software application is in response to determining that the performance of the second software application is more than the performance of the rest of the set of backup software applications.

8. A method comprising:

accessing a first set of parameters associated with a first software application, wherein the first set of parameters comprises at least one of a first amount of available processing resources or a first network load associated with the first software application;

accessing a second set of parameters associated with a second software application, wherein the second set of parameters comprises at least one of a second amount of available processing resources or a second network load associated with the second software application;

determining that more than a threshold percentage of the first set of parameters are within a threshold range from counterpart parameters from among the second set of parameters;

clustering the first software application and the second software application together in response to determining that more than the threshold percentage of the first set of parameters are within the threshold range from the counterpart parameters from among the second set of parameters;

determining that task data is communicated to the first software application, that when executed by a first processor, is configured to cause the first processor to perform a first portion of the task, wherein the task data, wherein the task data is associated with the task;

determining that the first portion of the task is not completed by the first processor; and in response to determining that the first portion of the task is not completed by the first processor and that the first software application and the second software application are clustered together:

simulating an execution of the first portion of the task by a second processor associated with the second software application;

determining that a simulation of the execution of the first portion of the task by the second processor indicates that the second software application, when executed by the second processor, causes the second processor to perform the first portion of the task;

in response to determining that the simulation of the execution of the first portion of the task by the second software application indicates that the second software application, when executed by the second processor, causing the second processor to perform the first portion of the task, route the task data to the second processor; and determining that the task is executed.

9. The method of claim 8, wherein:

the first software application resides within a first computing device comprising the first processor; and the second software application resides within a second computing device comprising the second processor.

10. The method of claim 8, further comprising:

extracting a set of metadata associated with the task data, wherein the set of metadata comprises at least one of a task type or an amount of processing resources to perform the task;

determining that the first processor has sufficient processing resources to perform the first portion of the task;

determining that the first software application is compatible with the task type; and generating a first key-value pair comprising the task data and the first software application to associate the task data and the first software application in response to determining that the first processor has sufficient processing resources to perform the first portion of the task and that the first software application is compatible with the task type, wherein task data is communicated to the first software application in response to a compatibility between the task data and the first software application based at least in part upon the first key-value pair.

11. The method of claim 8, further comprising generating a second key-value pair comprising the first software application and the second software application to associate the first software application with the second software application, wherein the second software application is determined to be a backup for the first software application if the first software application fails to cause the first processor to perform the first portion of the task.

12. The method of claim 8, further comprising:

determining that the second processor has sufficient processing resources to perform the first portion of the task;

determining that the second software application is compatible with a task type associated with the task;

determining that the second software application can be used as a backup for the first software application if the first software application fails to cause the first processor to perform the first portion of the task; and generating a third key-value pair comprising the first software application, the second software application, and the task data in response to determining that the second software application can be used as a backup for the first software application if the first software application fails to cause the first processor to perform the first portion of the task, wherein task data is communicated to the second software application in response to compatibility between the task data and the second software application based at least in part upon the third key-value pair.

13. The method of claim 8, wherein determining that the first portion of the task is not completed by the first software application comprises determining that the first network load associated with the first software application exceeds a predefined threshold or causes a delay of more than an acceptable latency.

14. The method of claim 8, further comprising:

simulating the execution of the first portion of the task at each of a set of backup software applications in response to determining that the first portion of the task failed to be performed by the first processor;

evaluating a performance of each of the set of backup software applications in conjunction with executing the first portion of the task, wherein the performance of each of the set of backup software applications is determined in terms of one or more of delay, resource utilization, and success rate;

determining that the performance of the second software application is more than the performance of a rest of the set of backup software applications; and selecting the second software application to cause the second processor to perform the first portion of the task in response to determining that the performance of the second software application is more than the performance of the rest of the set of backup software applications, wherein routing the task data to the second software application is in response to determining that the performance of the second software application is more than the performance of the rest of the set of backup software applications.

15. A non-transitory computer-readable medium storing instructions that when executed by a processor, cause the processor to:

access a first set of parameters associated with a first software application, wherein the first set of parameters comprises at least one of a first amount of available processing resources or a first network load associated with the first software application;

access a second set of parameters associated with a second software application, wherein the second set of parameters comprises at least one of a second amount of available processing resources or a second network load associated with the second software application;

determine that more than a threshold percentage of the first set of parameters are within a threshold range from counterpart parameters from among the second set of parameters;

cluster the first software application and the second software application together in response to determining that more than the threshold percentage of the first set of parameters are within the threshold range from the counterpart parameters from among the second set of parameters;

determine that task data is communicated to the first software application, that when executed by a first processor, is configured to cause the first processor to perform a first portion of the task, wherein the task data, wherein the task data is associated with the task;

determine that the first portion of the task is not completed by the first processor; and in response to determining that the first portion of the task is not completed by the first processor and that the first software application and the second software application are clustered together:

simulate an execution of the first portion of the task by a second processor associated with the second software application;

determine that a simulation of the execution of the first portion of the task by the second processor indicates that the second software application, when executed by the second processor, causes the second processor to perform the first portion of the task;

in response to determining that the simulation of the execution of the first portion of the task by the second software application indicates that the second software application, when executed by the second processor, causes the second processor to perform the first portion of the task, route the task data to the second processor; and determine that the task is executed.

16. The non-transitory computer-readable medium of claim 15, wherein:

the first software application resides within a first computing device comprising the first processor; and the second software application resides within a second computing device comprising the second processor.

17. The non-transitory computer-readable medium of claim 15, wherein the instructions further cause the processor to:

extract a set of metadata associated with the task data, wherein the set of metadata comprises at least one of a task type or an amount of processing resources to perform the task;

determine that the first processor has sufficient processing resources to perform the first portion of the task;

determine that the first software application is compatible with the task type; and generate a first key-value pair comprising the task data and the first software application to associate the task data and the first software application in response to determining that the first processor has sufficient processing resources to perform the first portion of the task and that the first software application is compatible with the task type, wherein task data is communicated to the first software application in response to a compatibility between the task data and the first software application based at least in part upon the first key-value pair.

18. The non-transitory computer-readable medium of claim 15, wherein the instructions further cause the processor to generate a second key-value pair comprising the first software application and the second software application to associate the first software application with the second software application, wherein the second software application is determined to be a backup for the first software application if the first software application fails to cause the first processor to perform the first portion of the task.

19. The non-transitory computer-readable medium of claim 15, wherein the instructions further cause the processor to:

determine that the second processor has sufficient processing resources to perform the first portion of the task;

determine that the second software application is compatible with a task type associated with the task;

determine that the second software application can be used as a backup for the first software application if the first software application fails to cause the first processor to perform the first portion of the task; and generate a third key-value pair comprising the first software application, the second software application, and the task data in response to determining that the second software application can be used as a backup for the first software application if the first software application fails to cause the first processor to perform the first portion of the task, wherein task data is communicated to the second software application in response to compatibility between the task data and the second software application based at least in part upon the third key-value pair.

20. The non-transitory computer-readable medium of claim 15, wherein determining that the first portion of the task is not completed by the first software application comprises determining that the first network load associated with the first software application exceeds a predefined threshold or causes a delay of more than an acceptable latency.

* * * * *